Figure 1:
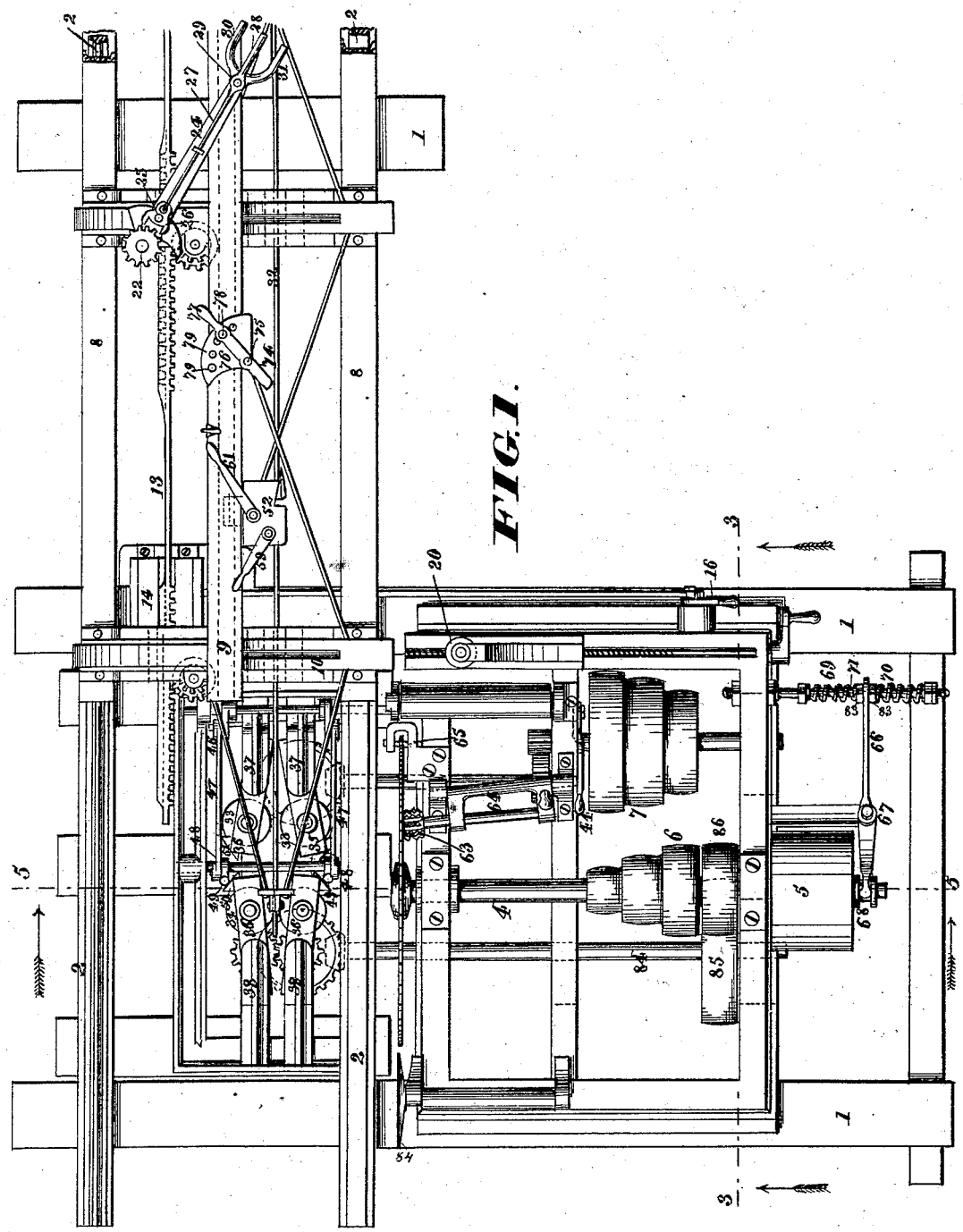

J. L. KNOWLTON.
Saw-Mills.

No. 157,843.

5 Sheets--Sheet 1.

Patented Dec. 15, 1874.

WITNESSES

INVENTOR
John L. Knowlton

J. L. KNOWLTON.
Saw-Mills.

No. 157,843.

Patented Dec. 15, 1874.

5 Sheets--Sheet 2.

WITNESSES

INVENTOR
John L. Knowlton.

J. L. KNOWLTON.
Saw-Mills.

No. 157,843.

5 Sheets--Sheet 3.

Patented Dec. 15, 1874.

WITNESSES
Jas. L. Ewin
Henry Tanner

INVENTOR
John L. Knowlton
By Knight Bro., Attorneys

5 Sheets--Sheet 4.
J. L. KNOWLTON.
Saw-Mills.
No. 157,843. Patented Dec. 15, 1874.
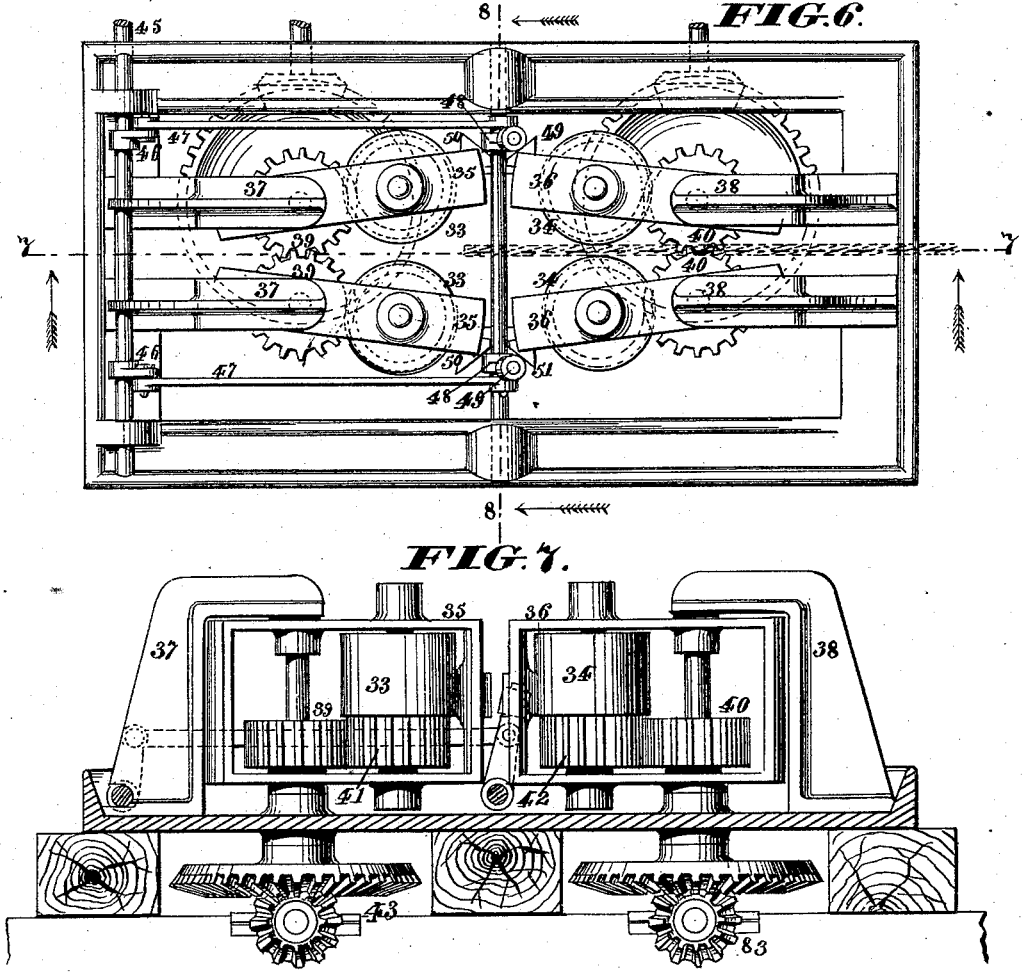
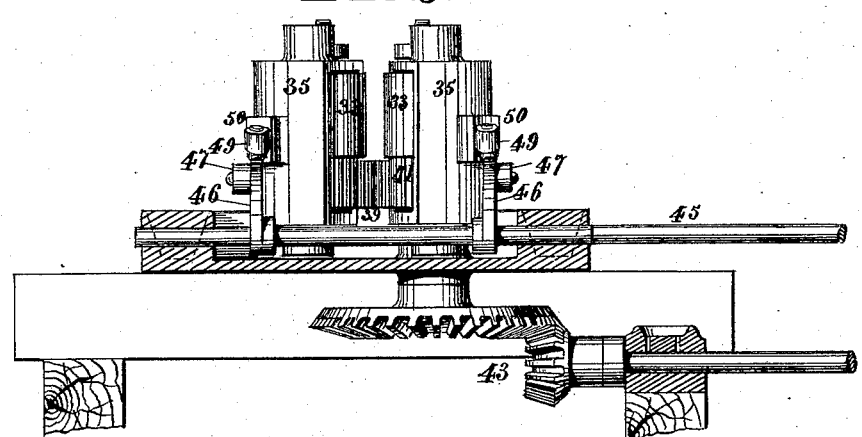
WITNESSES
Jas. L. Ewin
Henry Tanner
INVENTOR
John L. Knowlton
By Knight Bros. Attorneys 5 Sheets—Sheet 5.
J. L. KNOWLTON.
Saw-Mills.
No. 157,843. Patented Dec. 15, 1874.
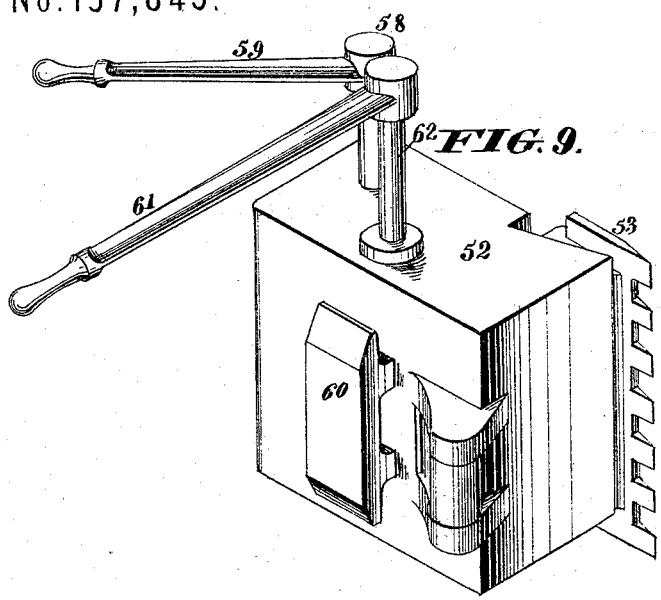
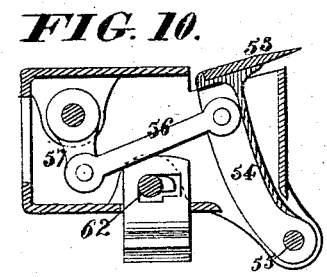
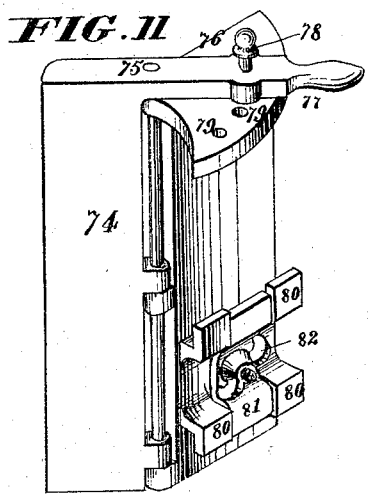
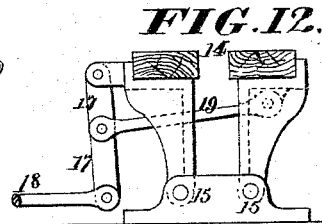
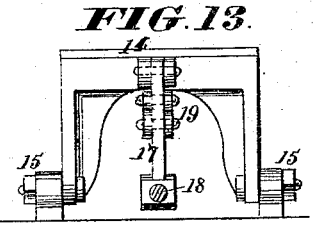
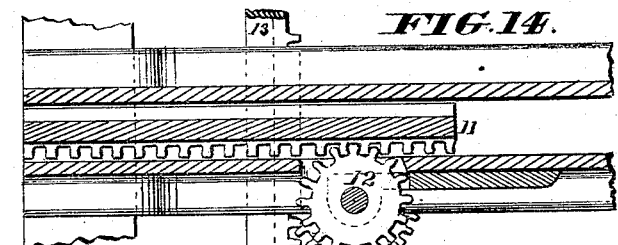
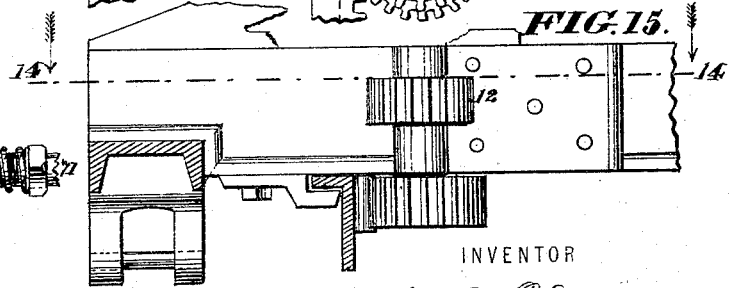
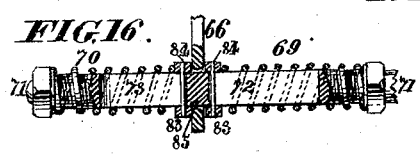
WITNESSES
INVENTOR
John L. Knowlton
By Knight Bros Attorneys
THE GRAPHIC CO. PHOTO-LITH. 39 & 41 PARK PLACE, N.Y.

UNITED STATES PATENT OFFICE.

JOHN L. KNOWLTON, OF SHARON HILL, PENNSYLVANIA.

IMPROVEMENT IN SAW-MILLS.

Specification forming part of Letters Patent No. 157,843, dated December 15, 1874; application filed August 31, 1874.

*To all whom it may concern:*

Be it known that I, JOHN L. KNOWLTON, of Sharon Hill, in the county of Delaware and State of Pennsylvania, have invented certain new and useful Improvements in Saw-Mills, of which the following is a specification:

The improvements consist, first, in a power-setting mechanism, consisting of a traveling rack-bar and a friction-clutch to arrest the movement of the said rack-bar, as hereinafter described; second, in a hand-setting device, consisting of a hand-lever, constructed with two rigid handles, and one pivoted handle, the latter being grasped in connection with one or other of the rigid handles, and thereby throwing one or other point of a double pawl into gear with an operating pinion, so as to set the head-block in either direction, the said pawl forming a spring-connection, which retracts it automatically from the pinion when released, as hereinafter described and claimed; third, in a feeding and gigging-back mechanism, consisting of a friction-bar depending from the carriage between two pairs of friction-rollers, which are constantly driven in opposite directions, and are mounted in pivoted housings, so that either pair of rollers may, at the will of the operator, be forced into contact with the friction-bar, and thus impart the feeding or gig-back motion to the carriage, as hereinafter described and claimed; fourth, in an improved dog, constructed and applied as hereinafter described, and serving to draw the log against the head-block by a slightly-oblique movement of the holding-points in the act of dogging the log; fifth, in a guiding-roller running on an oblique axis, and applied, as hereinafter described, between the guide-pins and the saw-arbor, to spring or bear off the board from the face of the saw; sixth, in the combination, with a saw-mandrel having end play, of springs to restore the mandrel to its normal position from either direction, and a stop, which prevents either spring from pressing the mandrel beyond its normal or central position, as described and claimed; seventh, in a supplemental head-block applied to the main head-block, as hereinafter described, for the purpose of holding one end of the log off from the face of the said head-block to any angle or extent required, as hereinafter described and claimed.

Figure 2:
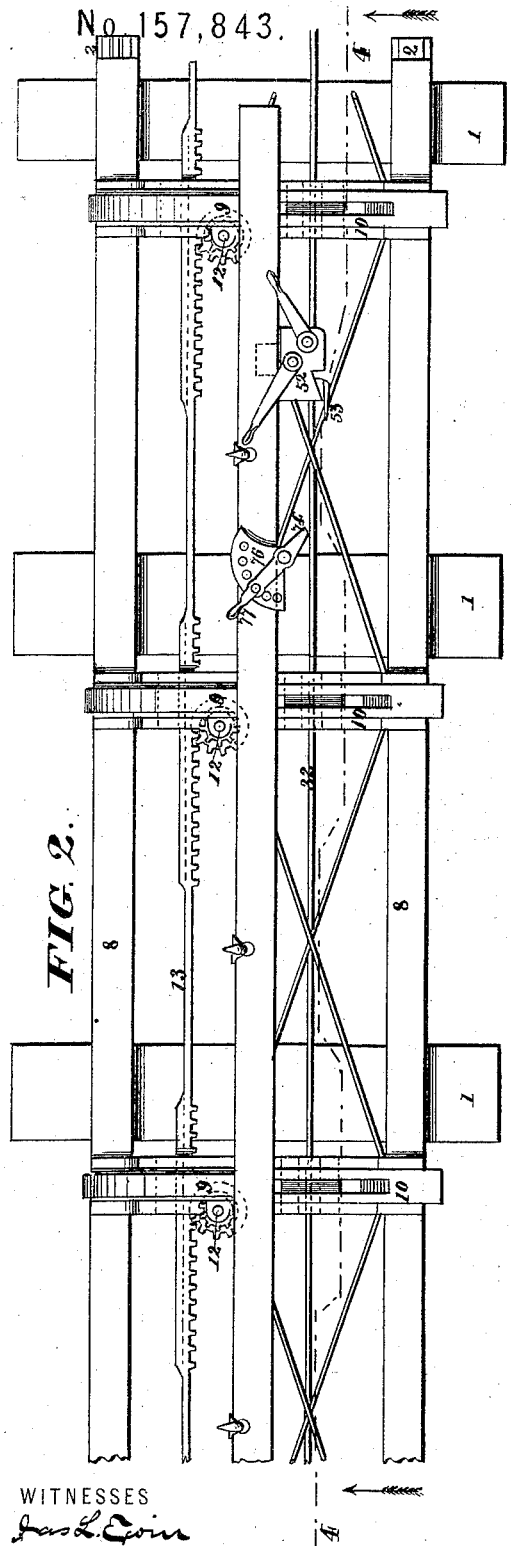
Figure 4:
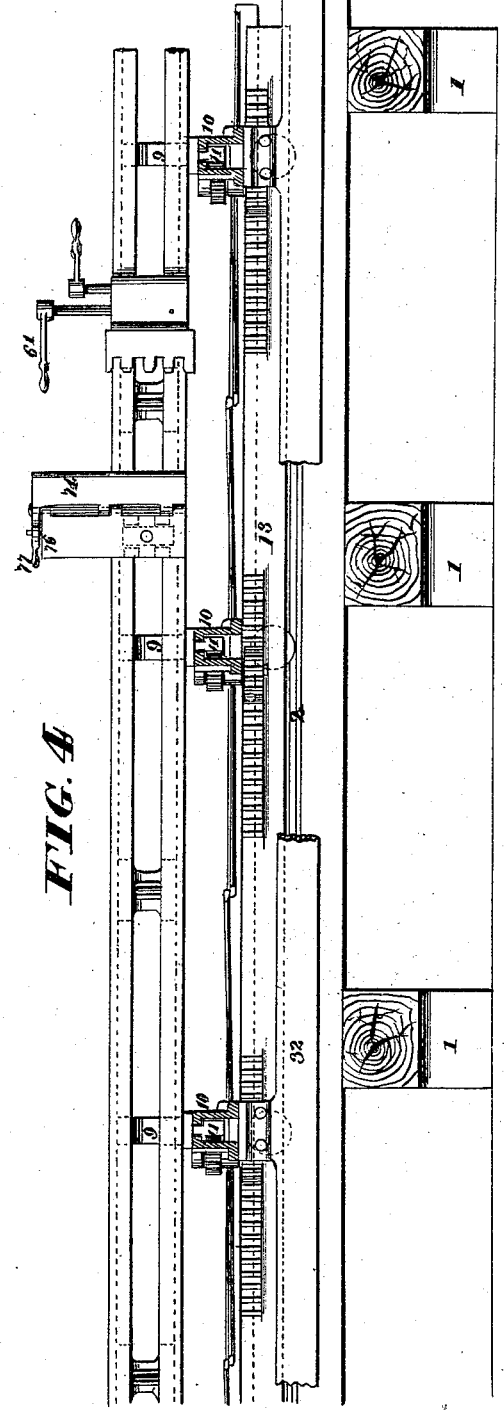
Figure 3:
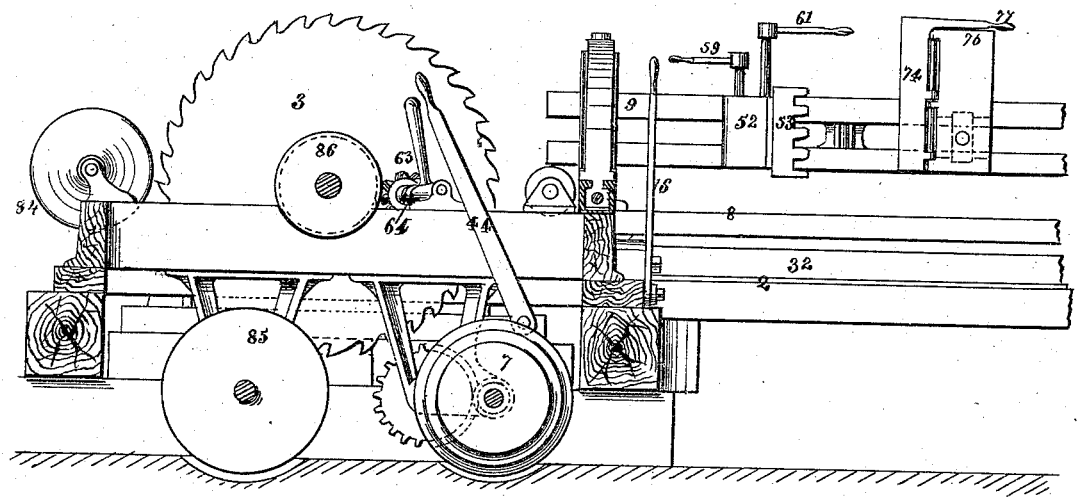
Figure 5:
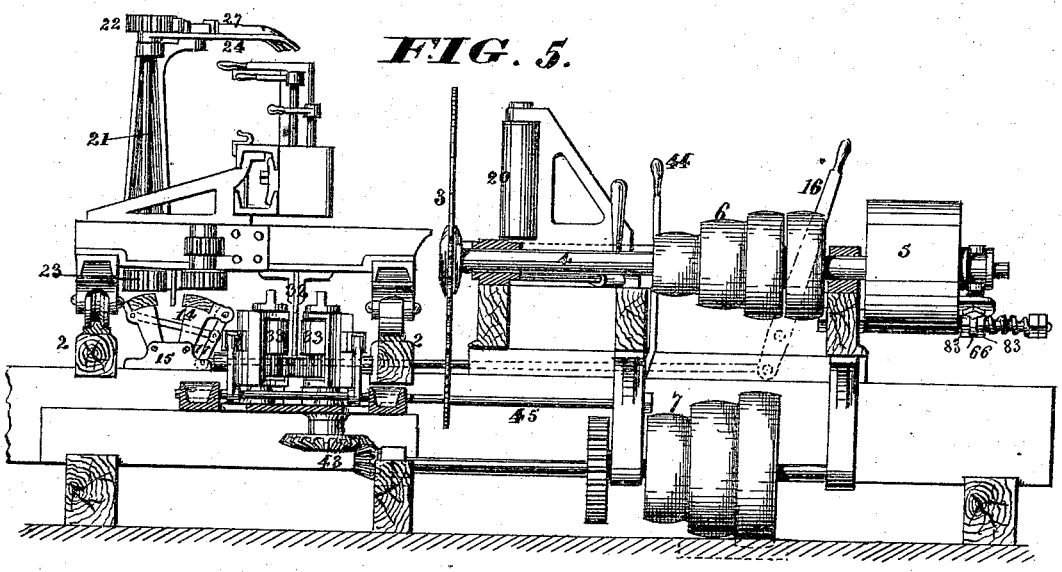

In the accompanying drawings, Figures 1 and 2 show in connection a plan of a saw-mill illustrating my invention. Figs. 3 and 4 are elevations of the corresponding parts of the mill shown in Figs. 1 and 2, respectively. Fig. 5 is an elevation of the forward end. Fig. 6 is a plan of the carriage-feeding apparatus on a larger scale. Fig. 7 is a longitudinal section on the line 7, Fig. 6. Fig. 8 is a transverse section on the line 8, Fig. 6. Fig. 9 is a perspective view of the dog and its accessories on a larger scale. Fig. 10 is a horizontal section of the same. Fig. 11 is a perspective view of an eccentric graduating-block. Fig. 12 is a vertical section of the friction-clutch. Fig. 13 is a side elevation of the same. Fig. 14 is a horizontal section of the setting mechanism on the line 14, Fig. 15. Fig. 15 is a transverse section of the same. Fig. 16 is a detached sectional view on a larger scale of the device for taking up the end play of the saw-mandrel.

The main frame 1, carriage-ways 2, saw-arbor 4, driving-pulleys 5 6 7, and other parts of the machine not hereinafter specifically described, may be of usual or any suitable construction, which may adapt them to work with the improvements constituting the particular subject of my invention.

The power-setting mechanism is constructed substantially as follows: 8 represents the log-carriage, which is made of any necessary length, and need not differ in its general construction from carriages now in use in saw-mills of this general class. The head-blocks 9 slide in ways 10, and are provided with racks 11, through which they receive their forward and backward movement toward and from the saw by the action of pinion-shafts 12, operated by a longitudinal rack-bar, 13, which, during the process of sawing a kerf, moves with the carriage; but when the log is to be set, or the head-block to be retracted, as the case may be, the said rack-bar is held at the will of the operator by means of a friction-clutch, 14, consisting of two jaws fulcrumed to the stationary frame at 15, and operated simultaneously through a system of compound levers 16 17 and connecting-rods 18 19, the action of which will be clearly understood by reference to Figs. 5 and 12.

The action of this device is such that, at the termination of the gig-back motion of the carriage, the hand-lever 16 being pressed forward by the operator, so as to press the jaws 14 toward each other, thus causing them to gripe the rack-bar 13, the movement of the said bar will be arrested, and the continued movement of the carriage will, consequently, impart a rotary movement to the pinion-shafts 12, which, being communicated to the racks 11 of the head-blocks, will set the log forward until its face comes in contact with the gage-roller 20. This roller arrests the setting movement of the head-blocks, the friction-clutch 14 permitting the rack-bar 13 to slip to any necessary extent. The sawyer is governed by his own judgment, experience, and observation in the force applied to the lever 16 to insure the full setting of the log into contact with the gage-roller without subjecting the parts to undue strain.

To provide for retracting or setting the head-blocks by hand, I employ, in connection with the power-setting mechanism just described, a vertical shaft, 21, having pinions 22 23 keyed upon its upper and lower ends, respectively, and having a hand-lever, 24, loosely fulcrumed upon it directly beneath the upper pinion 22. The lever 24 carries a double pawl, 25 26, and a spring, 27, which latter is formed in connection with a handle, 28, fulcrumed at 29 upon the lever 24, so that, by the deflection of the handle 28 in either direction, one or the other point of the double pawl 25 26 is caused to engage with the pinion 22. To assist in the deflection of the handle 28 and the rotation of the pinion 22, by the action of the lever 24 when the handle 28 is so deflected, I construct the lever 24 with two rigid handles, 30 31, so arranged that the handle 28 may be grasped in connection with either of the rigid handles 30 31, and when grasped in connection with one handle—30, for example—will throw the point 25 into gear with the pinion 22, so as to move the rack-bar 13 and the head-block gearing 12 11 in a direction to slide the head-blocks forward; but, if the handle 28 be grasped in connection with the handle 31, the point 26 of the pawl will be thrown into gear with the pinion 22, when a reciprocating movement of the lever 24 will retract the head-blocks. The spring 27 acts automatically to restore the double pawl 25 26 to its central or normal position, when the handle 28 is released, thus leaving the lever 24 entirely free from connection with the pinion-shaft 21, so as to avoid any danger of accident from the action of the power-setting mechanism.

The friction device for imparting the feed and gig-back motions to the log-carriage is constructed as follows: From the base of the carriage 8 projects downward a friction plate or bar, 32, in position to be griped by either pair of the friction-rollers 33 34, which are mounted in housings 35 36, respectively, pivoted at 37 38 concentrically with paired pinions 39 40, the two pinions of each pair being constantly in gear with each other, and with pinions 41 42, which are rigidly connected to the rollers 33 34, respectively. The pinions 39 are driven by gearing 43, connecting them with the shaft of the driving-pulleys 7, the pulleys 6 7 being arranged in various diameters relatively to the saw-mandrel, and to each other, so as to move the log-carriage with the desired speed, in the customary manner. For the purpose of throwing the friction-feed mechanism into action at the will of the operator, I provide a lever, 44, connected to a rock-shaft, 45, and connected by cranks 46 and rods 47 with another rock-shaft, 48, carrying tappets 49, arranged to act upon oblique projections 50 51 upon the housings 35 36, respectively. The gig-back pinion 40 is driven through gearing 83, shaft 84, and pulley 85 from the pulley 86 on the saw-mandrel. It will now appear that, as the pinions 39 and 40 are constantly moving in opposite directions, if the tappets 49 be so deflected as to bear against the projections 51, as illustrated in Fig. 6, friction-rollers 34 will be pressed into contact with the friction plate or bar 32, the position of which is illustrated in the dotted lines in Fig. 6, so as to move the carriage in one direction; and, if the tappets 49 be deflected so as to bear upon the projections 50, the rollers 34 will release the friction-plate, and the rollers 33 will be pressed into forcible contact with it, so as to move the carriage in the other direction. I thus provide an efficient feeding and gig-back mechanism, operated in either direction, at will, by a simple deflection of the lever 44, and acting upon the carriage with any necessary power, but through the medium of friction-gear, which prevents violence or injury to the parts.

The construction of my improved log-dog 52 is shown on a larger scale in Figs. 9, 10. The holding-plate or teeth 53 of the dog are mounted upon an arm, 54, fulcrumed at 55, and operated through the medium of a rod, 56, connecting it with the crank-arm 57, which is keyed upon a shaft, 58, carrying a hand-lever, 59, by which it is turned in either direction, so as to advance or retract the tooth-plate 53.

The dog is connected to the head-block 9 through the medium of a guiding-clutch, 60, fitting within suitable flanges on the said head-block, and advanced or retracted by means of a lever, 61, and cam-shaft 62, so that the dog may be immovably locked upon the head-block, or released, so as to slide longitudinally thereon.

In operation, the dogs being set in proper position, the lugs 60 are drawn in by means of the levers 61, so as to firmly clamp the dogs to the head-block, the tooth-plates 53 being in retracted position illustrated in Fig. 10. The lever 59 is then drawn around, so as to force out the tooth-plates 53, through the medium of the crank 57, connecting-rod 56, and lever-arm 54, the effect being to drive the tooth-plate into the ends of the log, and at the same time press the log more firmly against the face of the head-block. The crank 57 and rods 56 act as a toggle to lock the arms 54 firmly in this position, so that no pressure upon the holding-plates 53 can force them back.

For the purpose of springing and bearing away the severed board from contact with the face of the saw I employ a grooved or toothed roller, 63, carried by an oblique shaft, 64, and located between the guiding-pins 65, near the cutting-edge of the saw, and the center or mandrel of the latter. The oblique axis of this roller and its curved or toothed periphery causes it to act to constantly deflect the board in course of being sawed away from the saw, so as to prevent friction against the face thereof. 84, in Figs. 1 and 3, represents the customary spreading or wedge wheel.

My mechanism for taking up the end play of the saw-mandrel and restoring it to its normal position when released is constructed as follows: 66 represents a lever, fulcrumed at 67 to the main frame, and connected to the end of the saw-mandrel 4 through the medium of a collar, 68. The other end of the lever 66 is pressed in each direction toward the center by springs 69 70, working upon the rod 71, which is formed with slots 72 73, or with any other suitable stop mechanism which will prevent the respective springs 69 70 from pressing the lever 66 beyond its normal or central position, but will allow the said lever, under the pressure of the saw-mandrel, to bear back either of the springs 69 70. In the present illustration I have shown the springs 69 70 bearing against sliding collars 83, through which pass pins 84, working in the slots 72 73, and stopped by the central web 85 of the shaft. The lever 66 is restored to its central position by the pressure of the respective sleeves 83, after deflection in either direction.

For the purpose of holding the log off from the face of the carriage to any extent required I employ an eccentric or variable head-block, consisting of a cam-bar, 74, fulcrumed, at 75, in a supplemental head-block, 76, which is constructed with ears 80, fitted to slide upon the main head-block 9. The eccentric bearing-bar 74 is constructed with a lever, 77, perforated for the reception of a holding-pin, 78, which may be inserted in either of the apertures 79 of the supplemental head-block 76, so as to hold the bearing-plate 74 in a position parallel with the face of the main head-block, or in any degree of projection therefrom. To hold the supplemental head-block 76 immovably in place when in use I employ a clamp, 81, operated by a nut, 82.

The following is claimed as new:

1. The power setting mechanism, herein described, consisting of a traveling rack-bar and a stationary friction-clutch, to arrest the movement of the latter.

2. The combination, with the hand setting-lever 24, of the double pawl 25, spring 27, and handles 28 30 31, substantially as and for the purposes set forth.

3. The frictional feeding and gigging-back mechanism, herein described, consisting of a plate or bar depending from the log-carriage, and two pairs of friction-rollers with gearing for driving the same, mounted in pivoted frames, with a system of tappets and cam-plates for throwing either pair of rollers into contact with the driving-power or plate at the will of the operator, all substantially as set forth.

4. The dog, constructed, mounted, and operated, as herein described, so as to impart a slightly-oblique movement to its holding-points, in a manner tending to draw the log against the head-block, as set forth.

5. The guiding-roller, applied, substantially as set forth, between the guide-pins and the center of the saw, to spring the severed board from the face of the saw, as explained.

6. The combination of the central stop 85 with the spring 69 70, lever 66, and a saw-mandrel having end play so as to permit the springs to press the said lever toward but not beyond its central position, as set forth.

7. The combination of the eccentric bearing-bar 74, supplemental sliding head-block 76, and adjusting devices 77 78 79 with the main head-block 9, as and for the purposes set forth.

JOHN L. KNOWLTON.

Witnesses:
OCTAVIUS KNIGHT,
JAS. L. EWIN.